(12) United States Patent
Chae et al.

(10) Patent No.: US 6,747,725 B2
(45) Date of Patent: Jun. 8, 2004

(54) DEVICE FOR CUTTING LIQUID CRYSTAL DISPLAY PANEL AND METHOD FOR CUTTING USING THE SAME

(75) Inventors: Kyung-Su Chae, Daegu-kwangyokshi (KR); Sang-Sun Shin, Kyongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 41 days.

(21) Appl. No.: 10/126,939

(22) Filed: Apr. 22, 2002

(65) Prior Publication Data

US 2003/0147035 A1 Aug. 7, 2003

(30) Foreign Application Priority Data

Feb. 7, 2002 (KR) .......................................... 2002-7179

(51) Int. Cl.[7] .............................................. G02F 1/1333
(52) U.S. Cl. .................... 349/158; 349/187; 216/23; 438/33; 438/113; 438/458; 438/464
(58) Field of Search ............................. 349/158, 187; 216/23; 438/33, 113, 458, 464

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. ........... 29/592 R |
| 4,653,864 A | 3/1987 | Baron et al. |
| 4,691,995 A | 9/1987 | Yamazaki et al. ....... 350/331 R |
| 4,775,225 A | 10/1988 | Tsuboyama et al. |
| 5,247,377 A | 9/1993 | Omeis et al. .................. 359/76 |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |

(List continued on next page.)

FOREIGN PATENT DOCUMENTS

| | | |
|---|---|---|
| EP | 1 003 066 A1 | 5/2000 |
| JP | 51-65656 | 6/1976 |
| JP | 52-149725 | 12/1977 |
| JP | 57-38414 | 3/1982 |
| JP | 57-88428 | 6/1982 |
| JP | 58-27126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 A | 6/1993 |
| JP | 5-265011 | 10/1993 |
| JP | 5-281557 | 10/1993 |
| JP | 5-281562 | 10/1993 |
| JP | 6-51256 | 2/1994 |

(List continued on next page.)

Primary Examiner—Toan Ton
Assistant Examiner—Andrew Schechter
(74) Attorney, Agent, or Firm—Morgan, Lewis & Bockius LLP

(57) ABSTRACT

A device for cutting a liquid crystal display panel and a method for cutting using the same are disclosed in the present invention. The device includes a first scribing unit having first and second wheels for forming a first scribing line on surfaces of first and second mother substrates that are bonded to each other, a first breaking unit for breaking the first and second mother substrates along the first scribing line, a first rotating unit for rotating the first and second mother substrates to form a second scribing line.

20 Claims, 16 Drawing Sheets

U.S. PATENT DOCUMENTS

| | | | |
|---|---|---|---|
| 5,507,323 A | 4/1996 | Abe | |
| 5,511,591 A | 4/1996 | Abe | 141/7 |
| 5,539,545 A | 7/1996 | Shimizu et al. | |
| 5,548,429 A | 8/1996 | Tsujita | |
| 5,642,214 A | 6/1997 | Ishii et al. | 349/96 |
| 5,680,189 A | 10/1997 | Shimizu et al. | |
| 5,742,370 A | 4/1998 | Kim et al. | 349/124 |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | 222/1 |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | 349/190 |
| 6,016,178 A | 1/2000 | Kataoka et al. | 349/117 |
| 6,016,181 A | 1/2000 | Shimada | |
| 6,055,035 A | 4/2000 | Von Gutfeld et al. | 349/187 |
| 6,163,357 A | 12/2000 | Nakamura | 349/155 |
| 6,195,149 B1 * | 2/2001 | Kodera et al. | 349/187 |
| 6,219,126 B1 | 4/2001 | Von Gutfeld | |
| 6,226,067 B1 | 5/2001 | Nishiguchi et al. | 349/155 |
| 6,236,445 B1 | 5/2001 | Foschaar et al. | |
| 6,304,306 B1 | 10/2001 | Shiomi et al. | 349/88 |
| 6,304,311 B1 | 10/2001 | Egami et al. | 349/189 |
| 6,337,730 B1 | 1/2002 | Ozaki et al. | |
| 6,414,733 B1 | 7/2002 | Ishikawa et al. | 349/110 |
| 6,470,782 B1 * | 10/2002 | Shimotoyodome et al. | 83/879 |
| 2001/0021000 A1 | 9/2001 | Egami | 349/187 |

FOREIGN PATENT DOCUMENTS

| | | |
|---|---|---|
| JP | 6-148657 | 5/1994 |
| JP | 6-160871 | 6/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | 8-95066 | 4/1996 |
| JP | 8-101395 A | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-142864 A | 3/1999 |
| JP | 11-109388 | 4/1999 |
| JP | 11-133438 A | 5/1999 |
| JP | 11-174477 | 7/1999 |
| JP | 11-212045 | 8/1999 |
| JP | 11-248930 A | 9/1999 |
| JP | 11-326922 A | 11/1999 |
| JP | 11-344714 | 12/1999 |
| JP | 2000-2879 A | 1/2000 |
| JP | 2000-29035 | 1/2000 |
| JP | 2000-56311 A | 2/2000 |
| JP | 2000-66165 A | 3/2000 |
| JP | 2000-137235 A | 5/2000 |
| JP | 2000-147528 A | 5/2000 |
| JP | 2000-193988 A | 7/2000 |
| JP | 2000-241824 A | 9/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-338501 A | 12/2000 |
| JP | 2001-5401 A | 1/2001 |
| JP | 2001-5405 A | 1/2001 |
| JP | 2001-13506 A | 1/2001 |
| JP | 2001-33793 A | 2/2001 |
| JP | 2001-42341 A | 2/2001 |
| JP | 2001-51284 A | 2/2001 |
| JP | 2001-66615 A | 3/2001 |
| JP | 2001-91727 A | 4/2001 |
| JP | 2001-117105 | 4/2001 |
| JP | 2001-117109 A | 4/2001 |
| JP | 2001-133745 A | 5/2001 |
| JP | 2001-133794 | 5/2001 |
| JP | 2001-133799 A | 5/2001 |
| JP | 2001-142074 | 5/2001 |
| JP | 2001-147437 | 5/2001 |
| JP | 2001-154211 | 6/2001 |
| JP | 2001-166272 A | 6/2001 |
| JP | 2001-166310 A | 6/2001 |
| JP | 2001-183683 A | 7/2001 |
| JP | 2001-201750 A | 7/2001 |
| JP | 2001-209052 A | 8/2001 |
| JP | 2001-209060 A | 8/2001 |
| JP | 2001-215459 A | 8/2001 |
| JP | 2001-222017 A | 8/2001 |
| JP | 2001-235758 A | 8/2001 |
| JP | 2001-255542 | 9/2001 |
| JP | 2001-264782 | 9/2001 |
| JP | 2001-272640 A | 10/2001 |
| JP | 2001-281675 A | 10/2001 |
| JP | 2001-281678 A | 10/2001 |
| JP | 2001-282126 A | 10/2001 |
| JP | 2001-305563 A | 10/2001 |
| JP | 2001-330837 A | 11/2001 |
| JP | 2001-330840 | 11/2001 |
| JP | 2001-356353 A | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-20254 | 7/2002 |
| JP | 2002-202512 | 7/2002 |
| JP | 2002-214626 | 7/2002 |
| KR | 2000-0035302 A | 6/2000 |

* cited by examiner

DEVICE FOR CUTTING LIQUID CRYSTAL DISPLAY PANEL AND METHOD FOR CUTTING USING THE SAME

This application claims the benefit of the Korean Application No. P2002-007179 filed on Feb. 7, 2002, which is hereby incorporated by reference.

BACKGROUND OF THE INVENTION

1. Field of the Invention

The present invention relates to a liquid crystal display panel, and more particularly, to a device for cutting a liquid crystal display panel and a method for cutting using the same to separate a unit liquid crystal display panel from the mother substrate.

2. Discussion of the Related Art

In general, a liquid crystal display device displays a desired picture by individually supplying a data signal according to picture information to the liquid crystal cell arranged in a matrix form and controlling light transmittance of the liquid crystal cells.

The liquid crystal display device includes a liquid crystal display panel on which liquid crystal cells of a pixel unit are arranged in a matrix form and a driver integrated circuit (IC) for driving the liquid crystal cells.

The liquid crystal display panel includes a color filter substrate and a thin film transistor array substrate that are facing into each other and a liquid crystal filled between the color filter substrate and the thin film transistor array substrate.

On the thin film transistor array substrate of the liquid crystal panel, there are a plurality of data lines for transmitting a data signal supplied from a data driver integrated circuit to the liquid crystal cell and a plurality of gate lines for transmitting a scan signal supplied from a gate driver integrated circuit to the liquid crystal cells. The liquid crystal cells are defined at each portion where the data lines and the gate lines cross each other.

The gate driver integrated circuit sequentially supplies a scan signal to the plurality of gate lines so that the liquid crystal cells arranged in a matrix form are sequentially selected line by line. A data signal is supplied from the data driver integrated circuit to the selected line of the liquid crystal cells.

Meanwhile, a common electrode and a pixel electrode are formed on the color filter substrate and the thin film transistor array substrate to face into each other for applying an electric field to the liquid crystal layer.

The pixel electrode is formed by liquid crystal cells on the thin film transistor array substrate, while the common electrode is integrally formed on the entire surface of the color filter substrate.

Accordingly, by controlling a voltage applied to the pixel electrode while a voltage is applied to the common electrode, the light transmittance of the liquid crystal cells is individually controlled.

In order to control the voltage applied to the pixel electrode by each liquid crystal cell, a thin film transistor used as a switching device is formed at each liquid crystal cell.

To improve yield in fabricating a liquid crystal display device, a plurality of thin film transistor array substrates are formed on one large mother substrate, and a plurality of color filter substrates are formed on the other mother substrate. The two mother substrates are then attached to simultaneously form the plurality of liquid crystal panels. Thus, a process for cutting the liquid crystal panel into a plurality of unit panels is required.

Cutting the liquid crystal display panel is performed by a scribing process for forming a scribing line on the surface of the mother substrate with a pen made of diamond having a hardness higher than that of glass and a breaking process for cutting by applying a mechanical force along the scribing line.

The cutting process will now be described in detail with reference to the accompanying drawings.

FIG. 1 is a schematic plane view showing a unit liquid crystal panel formed with a thin film transistor array substrate 1 and a color filter substrate 2 attached to face into each other.

In FIG. 1, the liquid crystal panel 10 includes a picture display unit 13 having a plurality of liquid crystal wells arranged in a matrix form, a gate pad unit 14 connected to a plurality of gate lines of the picture display unit 13, and a data pad unit 15 connected to the gate pad unit 14 and a plurality of data lines.

The gate pad unit 14 and the data pad unit 15 are formed at the marginal portion of the thin film transistor array substrate 1. The portion does not overlap the color filter substrate 2.

The gate pad unit 14 supplies a scan signal supplied from the gate driver integrated circuit to the gate lines of the picture display unit 13. The data pad unit 15 supplies picture information supplied from the data driver integrated circuit to the data lines of the picture display unit 13.

The data lines receiving the picture information and the gate lines receiving the scan signal are disposed to be crossed orthogonally on the thin film transistor array substrate 1 of the picture display unit 13. At the crossed portion, a thin film transistor is formed for switching the liquid crystal cells, and a pixel electrode is formed to be connected to the thin film transistor for driving the liquid crystal cell. Further, a protective film is formed at the entire surface to protect the electrode and the thin film transistor.

At the color filter substrate 2 of the picture display unit 13, a plurality of color filters are coated to be separated by cell regions with a black matrix, and a common transparent electrode corresponding to the pixel electrode are formed at the thin film transistor array substrate 1.

A cell gap is formed between the thin film transistor array substrate 1 and the color filter substrate 2 so that the two substrates are spaced apart and face into each other. The thin film transistor array substrate 1 and the color filter substrate 2 are attached by a sealant (not shown) formed at the exterior of the picture display unit 13. A liquid crystal layer (not shown) is formed at the space between the thin film transistor array substrate 1 and the color filter substrate 2.

FIG. 2 is a cross-sectional view showing a plurality of unit liquid crystal display panels formed in the first mother substrate having the thin film transistor array substrate 1 and the second mother substrate with the color filter substrate 2.

As shown in FIG. 2, a plurality of unit panels are formed in such a manner that one side of the thin film transistor array substrate 1 is protruded as much as a dummy region 31.

This is because the gate pad unit 14 and the data pad unit 15 are formed at the marginal portion where the thin film transistor array substrate 1 and the color filter substrate 2 do not overlap.

Thus, the color filter substrate 2 formed on the second mother substrate 30 is formed to be isolated as much as dummy regions 31 corresponding to the area that the thin film transistor array substrate 1 formed on the first mother substrate 20 are protruded.

Each unit panel is disposed at the first and second mother substrates 20 and 30 so that the first and the second mother substrates 20 and 30 are used at the maximum. Depending on a model, the unit panels are generally formed to be isolated as much as the dummy region 32.

After the first mother substrate 20 where the thin film transistor array substrates 1 are formed and the second mother substrate 30 where the color filter substrates 2 are formed are attached each other, the liquid crystal display panels are individually cut through the scribing process and the breaking process. The dummy regions 31 formed at the region where the color filter substrates 2 of the second mother substrate 30 are isolated. The dummy region 32 isolating the unit panels are simultaneously removed.

The cutting process to the unit panels will now be described with reference to FIGS. 3A to 3J.

As shown in FIG. 3A, the first mother substrate 20 and the second mother substrate 30 are loaded on a first table 33.

Next, as shown in FIG. 3B, the first table 33 is moved in one direction to sequentially form a plurality of first scribing lines 42 on the first mother substrate 20 with a cutting wheel 41.

After first and second mother substrates 20 and 30 in FIG. 3C are rotated by 90°, the first table 33 is moved to its original position to sequentially form a plurality of second scribing lines 43 on the surface of the first mother substrate 20 through the cutting wheel 41.

FIG. 3D illustrates the first and second mother substrates 20 and 30, which are overturned and loaded on a second table 34. While the second table 34 is moved in one direction, the second mother substrate 30 is pressed by a breaking bar 44 along the second scribing lines 43 so that a crack is transmitted on the first mother substrate 20.

Next, as shown in FIG. 3E, the second and first mother substrates 30 and 20 are rotated by 90°. While the second table 34 is moved to its original position, the second mother substrate 30 is pressed by the breaking bar 44 along the first scribing lines 42, so that a crack is transmitted on the first mother substrate 20.

As shown in FIG. 3F, the second and first substrates 30 and 20 are loaded on a third table 35. A plurality of third scribing lines 46 are sequentially formed on the surface of the second mother substrate 30 with a cutting wheel 45 by moving the third table 35 in one direction.

Thereafter, the second and first mother substrates 30 and 20 are rotated by 90°, as shown in FIG. 3G. A plurality of fourth scribing lines 47 are sequentially formed on the surface of the second mother substrate 30 with the cutting wheel 45 by moving the third table 35 to its original position.

As shown in FIG. 3H, the second and first mother substrates 30 and 20 are overturned and loaded on the fourth table 36. The first mother substrate 20 is pressed by a breaking bar 48 along the fourth scribing line 47 by moving the fourth table 36 in one direction, so that a crack is transmitted on the second mother substrate 30.

Next, the first and second mother substrates 20 and 30 are rotated by 90°, as shown in FIG. 3I. The first mother substrate 20 is pressed by the breaking bar 48 along the third scribing line 46 by moving the fourth table 36 to its original position, so that a crack is transmitted on the second mother substrate 30.

As shown in FIG. 3J, as the crack is transmitted on first and second mother substrates 20 and 30 along first through fourth scribing lines 42, 43, 46, and 47, unit panels are selectively unloaded by using a vacuum gripper 49 and conveyed to the equipment for next processes.

As mentioned above, in the conventional cutting device and cutting processes for the unit panel, scribing is performed four times and breaking is performed four times through four rotation processes and two overturning processes.

Thus, two scribing units including a rotating unit and two breaking units including a rotating unit and an overturning unit are required. These equipments would occupy much space in the working place. Thus, an installation expense and a space of the equipment are wasted.

In addition, much time is required for the scribing and breaking processes, resulting in a low productivity.

SUMMARY OF THE INVENTION

Accordingly, the present invention is directed to a device for cutting a liquid crystal display panel and a method for cutting using the same that substantially obviates one or more of problems due to limitations and disadvantages of the related art.

Another object of the present invention is to provide a device for cutting a liquid crystal display panel and a method for cutting using the same that are capable of reducing the number of scribing and breaking equipments and reducing time required for a process by minimizing rotations and overturnings for performing the scribing and breaking processes.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a device for cutting a liquid crystal display panel includes a first scribing unit having first and second wheels for forming a first scribing line on surfaces of first and second mother substrates that are bonded to each other, a first breaking unit for breaking the first and second mother substrates along the first scribing line, and a first rotating unit for rotating the first and second mother substrates to form a second scribing line.

In another aspect of the present invention, a device for cutting a liquid crystal display panel includes a first scribing unit having first and second wheels for forming first scribing lines on surfaces of first and second mother substrates that are bonded to each other, a first breaking unit for breaking the first and second mother substrates along the second scribing line, and a second breaking unit for breaking the cut first and second mother substrates along the first scribing line to separate out into a plurality of liquid crystal display panels.

In another aspect of the present invention, a method for cutting a liquid crystal display panel includes forming a first a first scribing line on surfaces of first and second mother substrates that are bonded to each other, performing a first breaking along the first scribing line, forming a second scribing line on the first and second mother substrates, and performing a second breaking along the second scribing line.

In a further aspect of the present invention, a method for cutting a liquid crystal display panel includes forming first and second scribing lines on surfaces of first and second mother substrates that are bonded to each other, performing a first breaking along the second scribing lines, and performing a second breaking the first and second mother substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
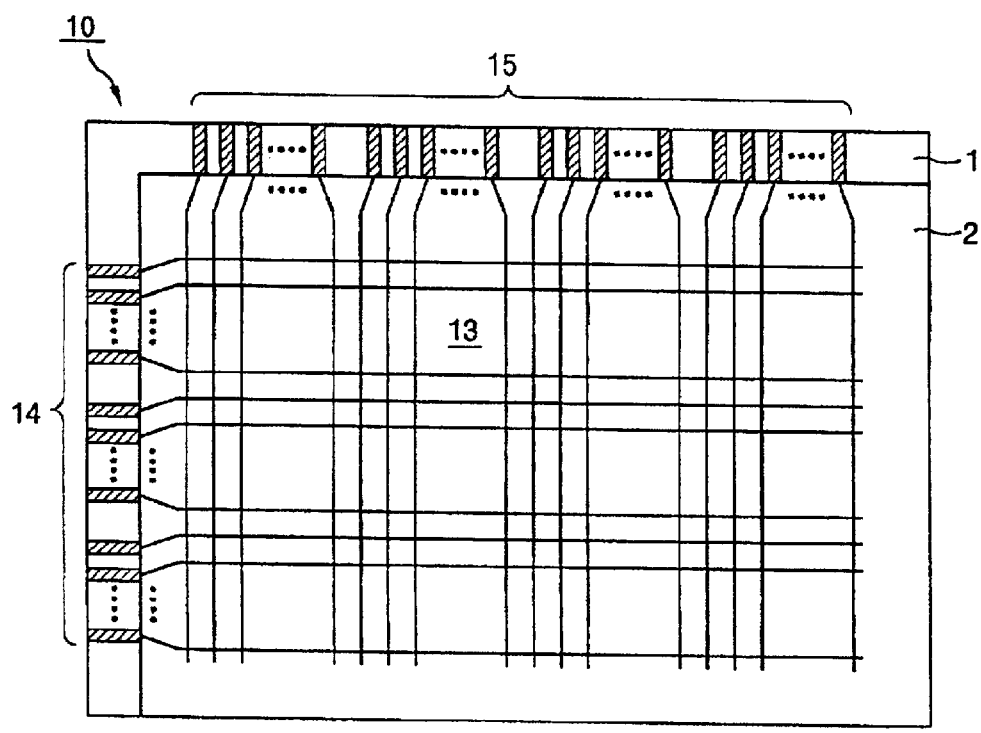
FIG. 1 is a plane view showing a unit liquid crystal display panel formed in the thin film transistor array substrate and a color filter substrate for a liquid crystal display device, which are attached to face into each other.
Figure 2:
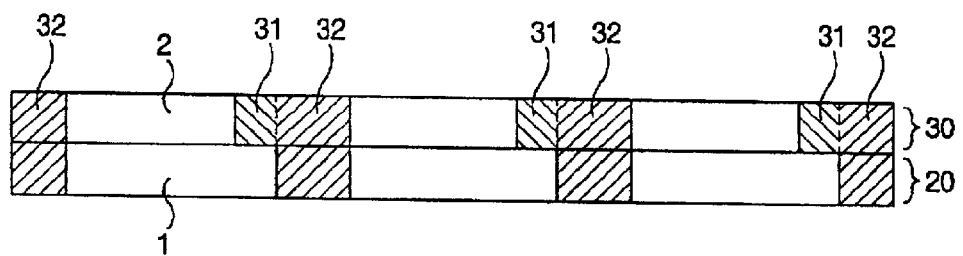
FIG. 2 is a cross-sectional view showing a plurality of liquid crystal display panels formed in the first mother substrate including the thin film transistor array substrates and the second mother substrate with the color filter substrate of FIG. 1.
Figure 3A:
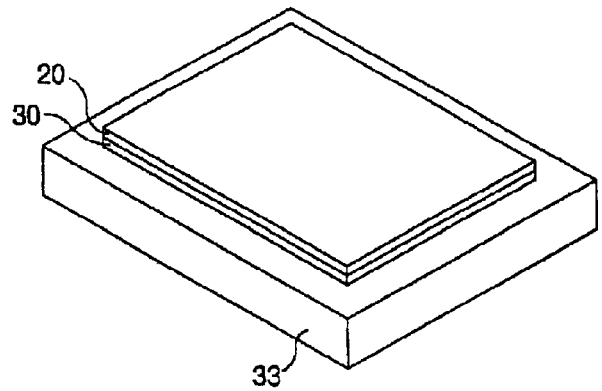
FIGS. 3A to 3J illustrate sequential cutting processes of unit panels in accordance with a related art.
Figure 3B:
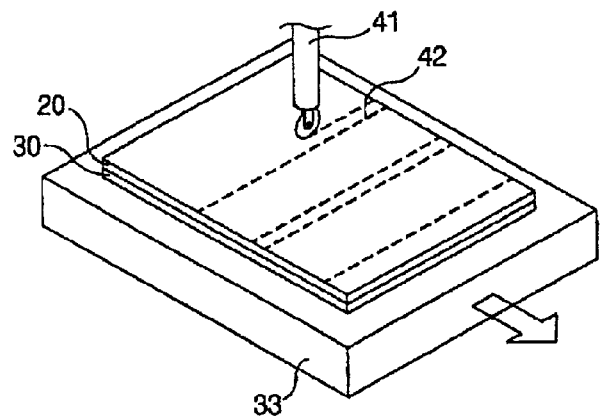
Figure 3C:
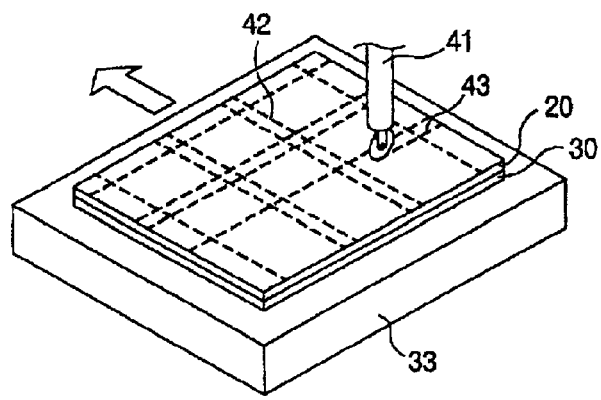
Figure 3D:
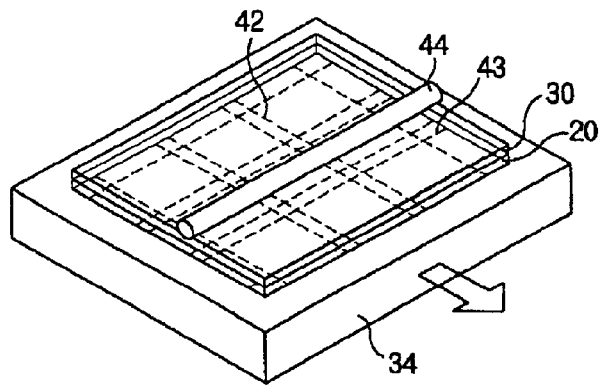
Figure 3E:
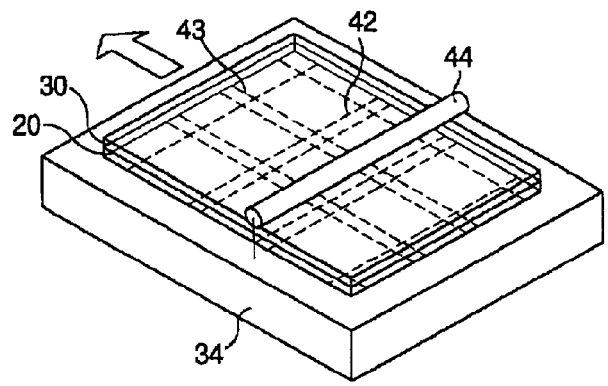
Figure 3F:
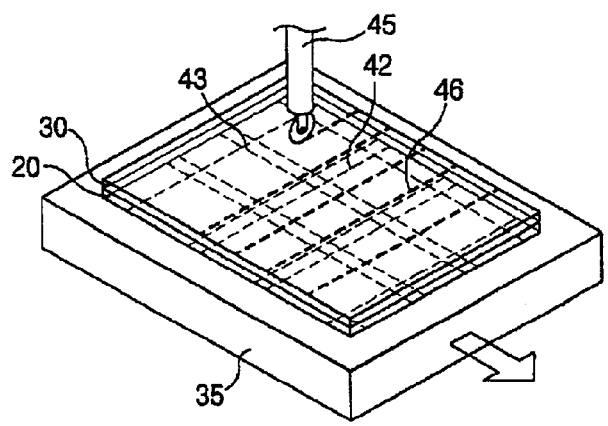
Figure 3G:
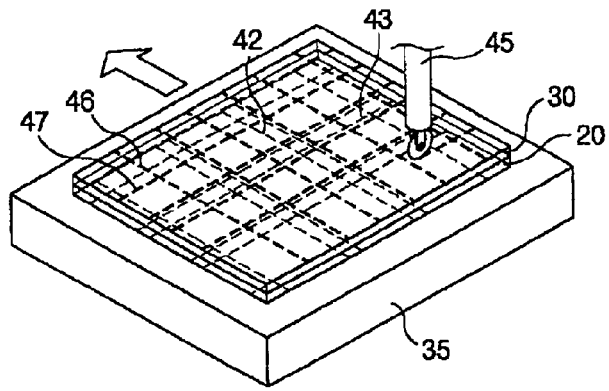
Figure 3H:
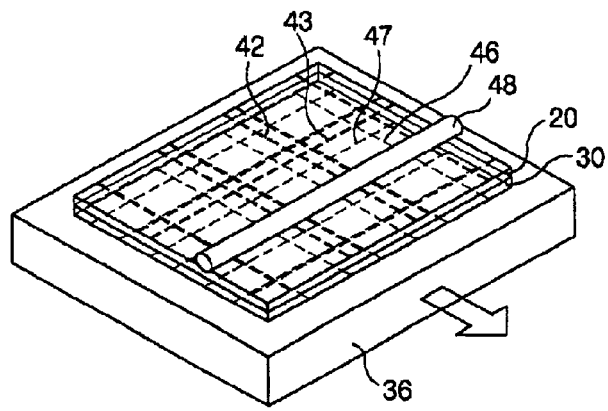
Figure 3I:
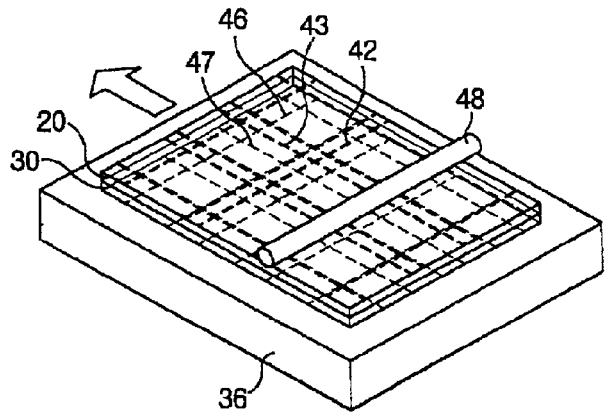
Figure 3J:
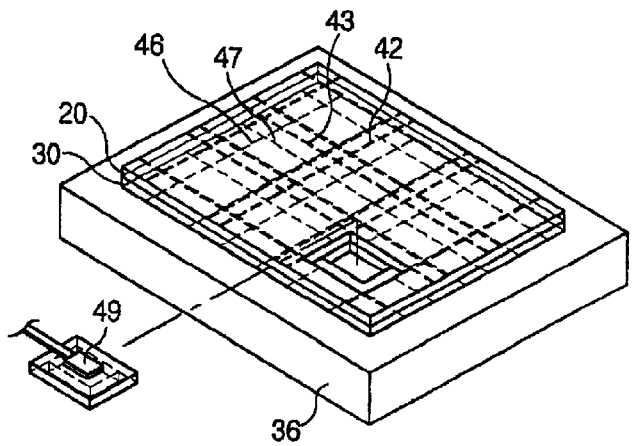
Figure 4:
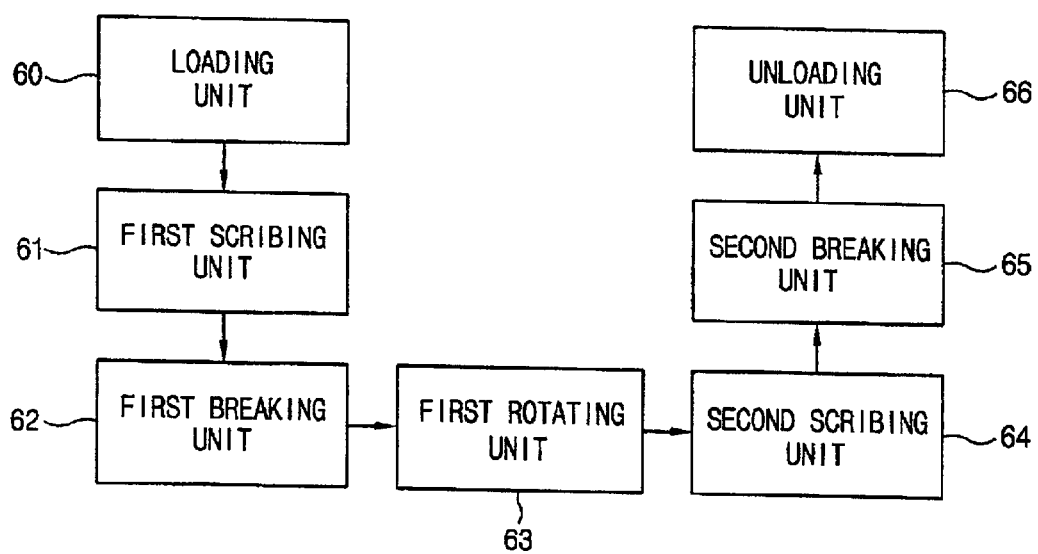
FIG. 4 is a schematic block diagram of a device for cutting a liquid crystal display panel in accordance with a first embodiment of the present invention.

FIG. 4 is a schematic block diagram of a cutter for cutting a liquid crystal display panel in accordance with a first embodiment of the present invention.

As shown in FIG. 4, a cutter for cutting a liquid crystal display panel in accordance with the first embodiment of the present invention includes a loading unit 60 for loading and aligning first and second mother substrates that are attached to each other, a first scribing unit 61 for forming a plurality of first scribing lines with a first upper wheel and a first lower wheel on the surface of the first and second mother substrates. A first breaking unit 62 is to break the first and second mother substrates by pressing with first and second breaking bars along the first scribing lines formed on the surface of the first and second mother substrates. A first rotating unit 63 is to rotate the first and second mother substrates by 90°. A second scribing unit 64 is to form a plurality of second scribing lines with a second upper wheel and a second lower wheel on the surface of the first and second mother substrates. A second breaking unit 65 is to break the first and second mother substrates by pressing with a third and a fourth breaking bars along the second scribing lines formed on the surface of the first and second mother substrates and to transmit a crack on the first and second mother substrate. Further, an unloading unit 66 is to rotate the first and second mother substrate by 90° to be in the direction the same as the initial loading direction, sequentially unloading a plurality of unit liquid crystal panels cut along the first and second scribing lines, and conveying to the equipment for the further processes.

FIGS. 5A to 5G illustrate sequential processes for performing each block of FIG. 4.

Figure 5A:
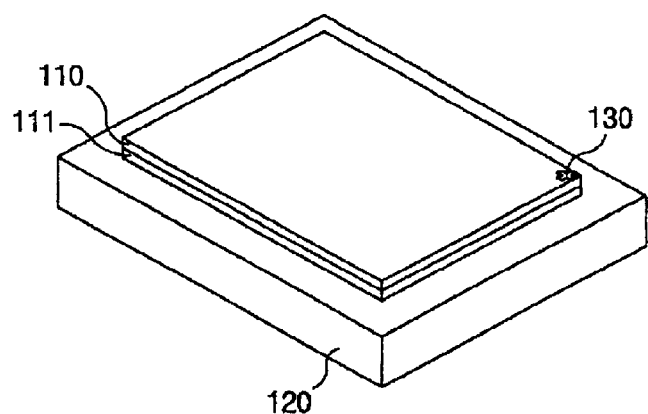
FIGS. 5A to 5G illustrate sequential processes in each block of FIG. 4.

As shown in FIG. 5A, the loading unit 60 loads a first mother substrate 110 and a second mother substrate 111 that are attached to each other. A plurality of thin film transistor array substrates are formed in the first mother substrate 110, and a plurality of color filter substrates are formed in the second mother substrate 111. The first and second mother substrates 110 and 111 are aligned through an alignment mark 130.

The first mother substrate 110 including the thin film transistor array substrates is stacked on the second mother substrate 111 including the color filter substrates. When the first and second mother substrates 110 and 111 are loaded as such a state, an impact to a gate pad unit or a data pad unit formed on the thin film transistor array substrate may be minimized by the following breaking process.

Figure 5B:
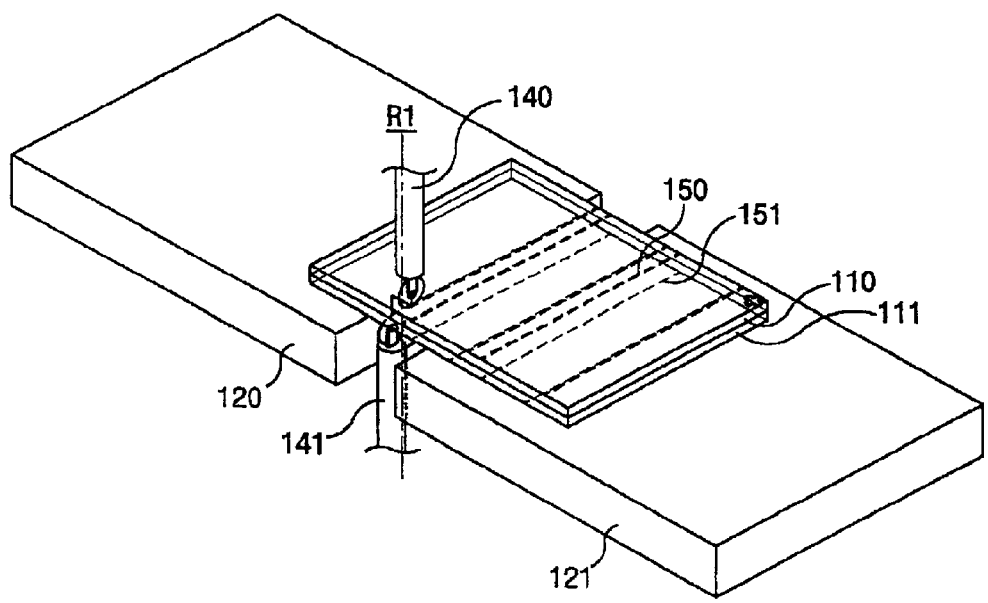

In FIG. 5B, the first scribing unit 61 sequentially forms a plurality of first scribing lines 150 and 151 on the surface of the first and second mother substrates 110 and 111, with a first upper wheel 140 and a first lower wheel 141, in the space between the first and second tables 120 and 121. The first and second mother substrates 110 and 111 move to one direction so that the first and second mother substrates 110 and 111 are placed between the first table 120 and the second table 121 that are isolated by a space therebetween.

One side of the thin film transistor array substrates formed at the first mother substrate 110 is protruded to be longer than the corresponding side of the color filter substrates formed at the second mother substrate 111. This is because the data pad unit formed at the gate pad unit is formed at one of the left and right sides, and the data pad unit is formed at one of the upper and lower sides of the thin film transistor array substrate.

Accordingly, at the region where one side of the thin film transistor array substrates is protruded to be longer than the corresponding side of the color filter substrates, the first upper wheel 140 is isolated for a certain distance to one side of a reference line R1, so as to form a first scribing line 150 on the surface of the first mother substrate 110. The first lower wheel 141 is isolated for a certain distance in the opposite direction corresponding to the first upper wheel 140 from the reference line R1, so as to form the first scribing line 151 on the surface of the second mother substrate 111.

At the region where no gate pad unit or data pad unit of the thin film transistor array substrates is formed (that is, the region where the thin film transistor array substrates are not protruded to be longer than the color filter substrates), the first upper wheel 140 and the first lower wheel 141 are aligned to the straight line, thereby forming the first scribing lines 150 and 151 on the surface of the first and second mother substrates 110 and 111.

Figure 5C:
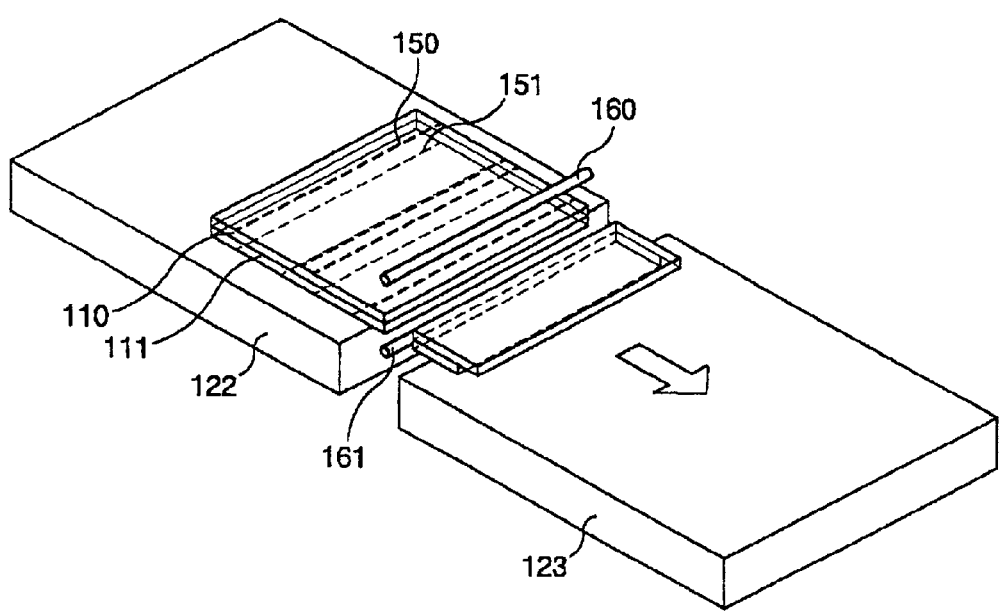

As shown in FIG. 5C, the first breaking unit 62 breaks the first and second mother substrates 110 and 111 by pressing with first and second breaking bars 160 and 161, along the first scribing lines 150 and 151 formed on the surface of the first and second mother substrates 110 and 111, in the space between the third and fourth tables 122 and 123 to transmit a crack on the first and second mother substrates 110 and 111. The first and second mother substrates 110 and 111 move to be placed between the third and fourth tables 122 and 123, thereby cutting the first and second mother substrates 110 and 111.

When the first mother substrate 110 is pressed by the first breaking bar 160, the second breaking bar 161 supports the second mother substrate 111. When the second mother substrate 111 is pressed by the second breaking bar 161, the first breaking bar 160 supports the first mother substrate 110.

Figure 5D:
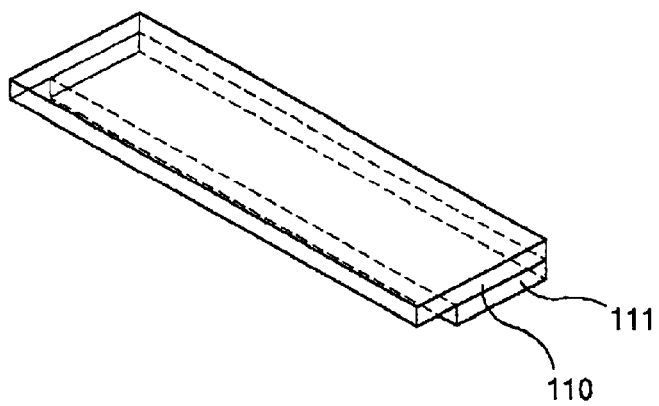

FIG. 5D illustrates the first rotating unit 63 rotating the cut first and second mother substrates 110 and 111 by 90°.

Figure 5E:
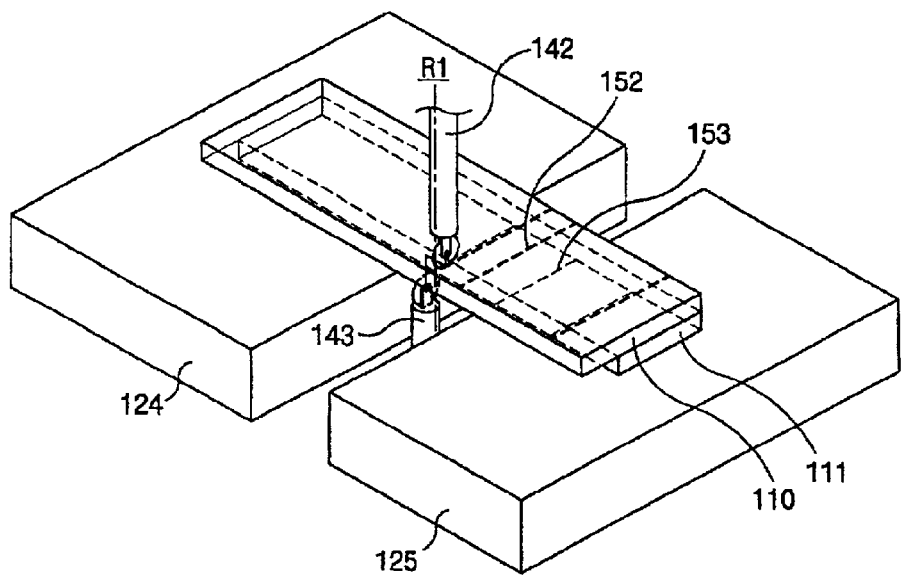

As shown in FIG. 5E, the second scribing unit 64 sequentially forms the second scribing lines 152 and 153 on the surface of the first and second mother substrates 110 and 111, with the second upper wheel 142 and the second lower wheel 143 located at the space between the fifth and sixth tables 124 and 125, while the first and second mother substrates 110 and 111 move to be placed between the fifth and sixth tables 124 and 125 that are isolated by the space therebetween.

As mentioned above, one side of the thin film transistor array substrates formed at the first mother substrate 110 is protruded to be longer than the corresponding side of the color filter substrates formed at the second mother substrate 111. Thus, at the protruded region, like the first upper wheel 140 and the first lower wheel 141, the second upper wheel 142 and the second lower wheel 143 are isolated from each other by a certain distance in the opposite direction along the reference line R1, so as to form the second scribing lines 152 and 153 on the surface of the first and second mother substrates 110 and Meanwhile, at the region where the thin film transistor array substrates are not protruded to be longer than the color filter substrates, like the first upper wheel 140 and the first lower wheel 141, the second upper wheel 142 and the second lower wheel 143 are aligned to each other, so as to form the second scribing lines 152 and 153 on the surface of the first and second mother substrates 110 and 111.

Figure 5F:
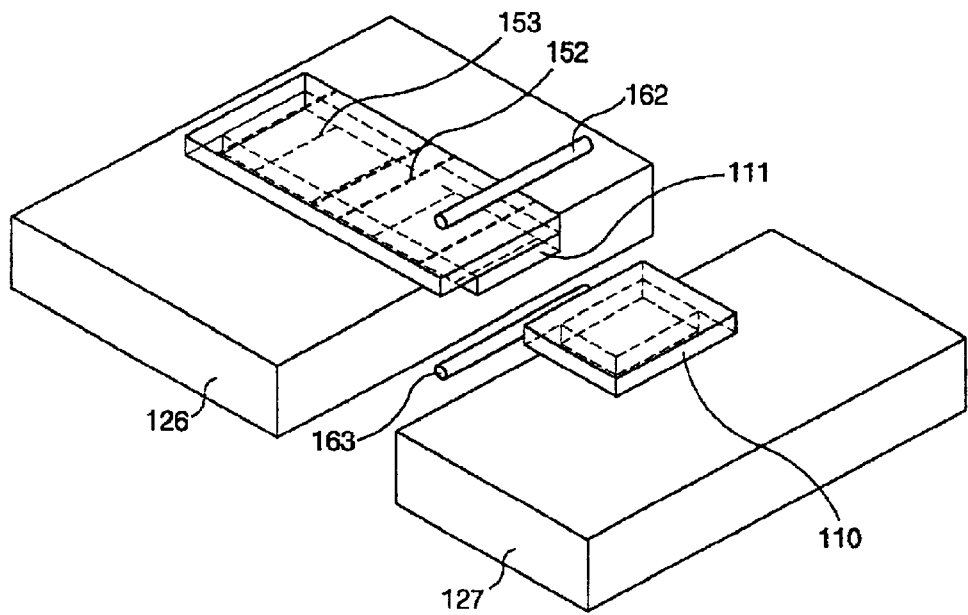

In FIG. 5F, the second breaking unit 65 presses the first and second mother substrates 110 and 111 with third and fourth breaking bars 162 and 163 along the second scribing lines 152 and 153, formed on the surface of the first and second mother substrates 110 and 111 at the space between the seventh and eighth tables 126 and 127, to transmit a crack on the first and second mother substrates 110 and 111. The first and second mother substrates 110 and 111 move to be placed between the seventh and eighth tables 126 and 127, thereby cutting the first and second mother substrates 110 and 111.

When the first mother substrate 110 is pressed by the third breaking bar 162, the fourth breaking bar 163 supports the second mother substrate 111. When the second mother substrate 111 is pressed by the fourth breaking bar 163, the third breaking bar 162 supports the first mother substrate 110.

Figure 5G:
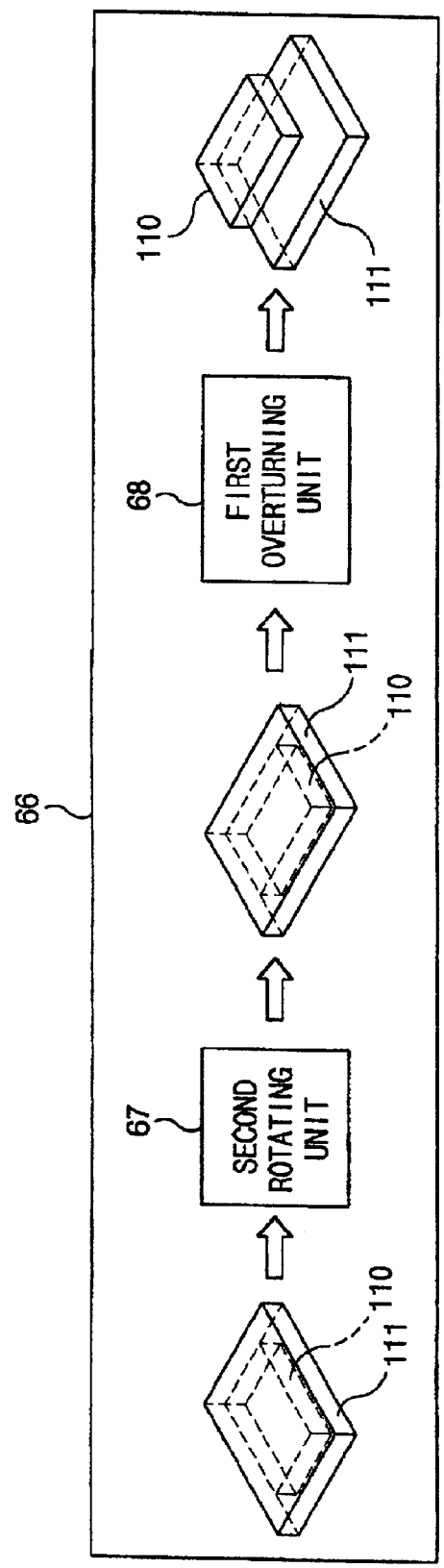

The unloading unit 66 sequentially unloads the unit panels cut along the first and second scribing lines 150 to 153 and conveys to the equipment for the following processes, as shown in FIG. 5G.

Meanwhile, the unit panels conveyed to the unloading unit 66 is rotated by 90° compared to the direction of the loading unit 60, as shown in FIG. 5G. A second rotating unit 67 is installed in the unloading unit 66 so as to rotate the unit panels by 90° and unloads the unit panels for facilitating the following processes.

In addition, in the following process, when a unit panel requires a state that the color filter substrate is stacked on the thin film transistor array substrate, as shown in FIG. 5G, the first overturning unit 68 may be installed in the unloading unit 66 to overturn the unloaded unit panels and convey to the equipment in the following processes.

As aforementioned, referring to the cutter for cutting a liquid crystal display panel and the method for cutting using the same in accordance with the first embodiment of the present invention, there requires only two simultaneous scribings of the first and second mother substrates and two simultaneous breakings of the first and second mother substrates. Also, the formed liquid crystal display panels are individually cut into the unit panels by rotating the first and second mother substrates once only.

Figure 6:
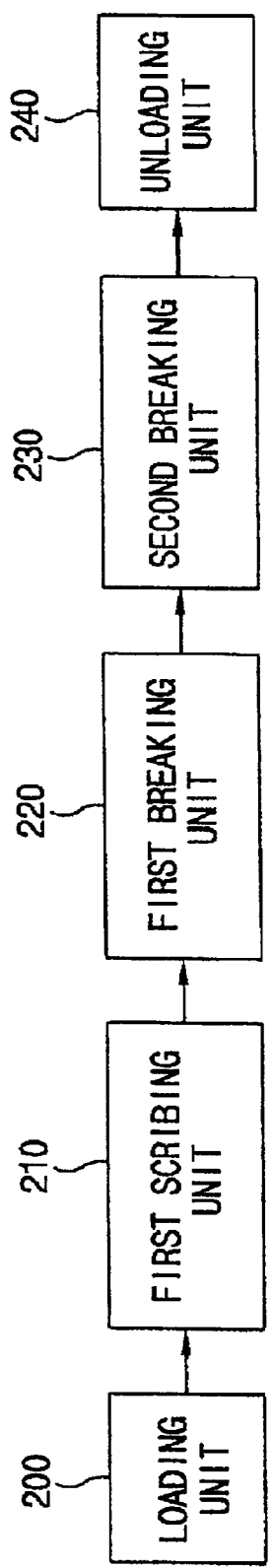
FIG. 6 is a schematic block diagram of a device for cutting a liquid crystal display panel in accordance with a second embodiment of the present invention.

FIG. 6 is a schematic block diagram of a cutter for cutting a liquid crystal display panel in accordance a second embodiment of the present invention.

As shown in FIG. 6, the cutter in accordance the second embodiment of the present invention includes a loading unit for loading and aligning first and second mother substrates that are attached to face into each other. A first scribing unit 210 is to sequentially form a plurality of first scribing lines with a first upper wheel and a first lower wheel on the surface of the first and second mother substrates with moving the first and second mother substrates in one direction, rotating the first and second mother substrates by 90°. A plurality of second scribing lines are sequentially formed with the first upper wheel and the first lower wheel on the surface of the first and second mother substrates with moving the first and second mother substrates to the original position. A first breaking unit 220 is to sequentially press the first and second mother substrates with first and second breaking bars along the second scribing lines formed on the surface of the first and second mother substrates with moving the first and second mother substrates in one direction to cut the first and second mother substrates. A second breaking unit 230 is to rotate the first and second mother substrates by 90°. The first and second mother substrates are sequentially pressed with third and fourth breaking bars along the first scribing lines with moving the first and second mother substrates as much as a predetermined distance in one direction. An unloading unit 240 is to sequentially unload the unit panels cut along the first and second scribing lines and convey to the equipment for the following processes.

Figure 7A:
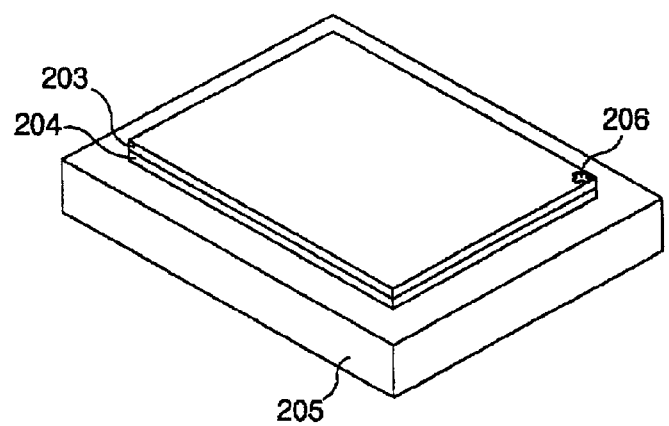
FIGS. 7A to 7F illustrate sequential processes for performing each block of FIG. 6.

FIGS. 7A to 7F illustrate sequential processes for performing each block of FIG. 6;

Initially, the loading unit 200 loads first and second substrates 203 and 204 that thin film transistor array substrates and color filter substrates are formed and attached to face into each other, on a first table 205. The first and second substrates 203 and 204 are aligned by an alignment mark 206, as shown in FIG. 7A.

The first mother substrate 203 including the thin film transistor array substrates is stacked on the second mother substrate 204 with the color filter substrates. When the first and second mother substrates 203 and 204 are loaded to be such a state, an impact to a gate pad unit or a data pad unit formed on the thin film transistor array substrate may be minimized in the following breaking processes.

Figure 7B:
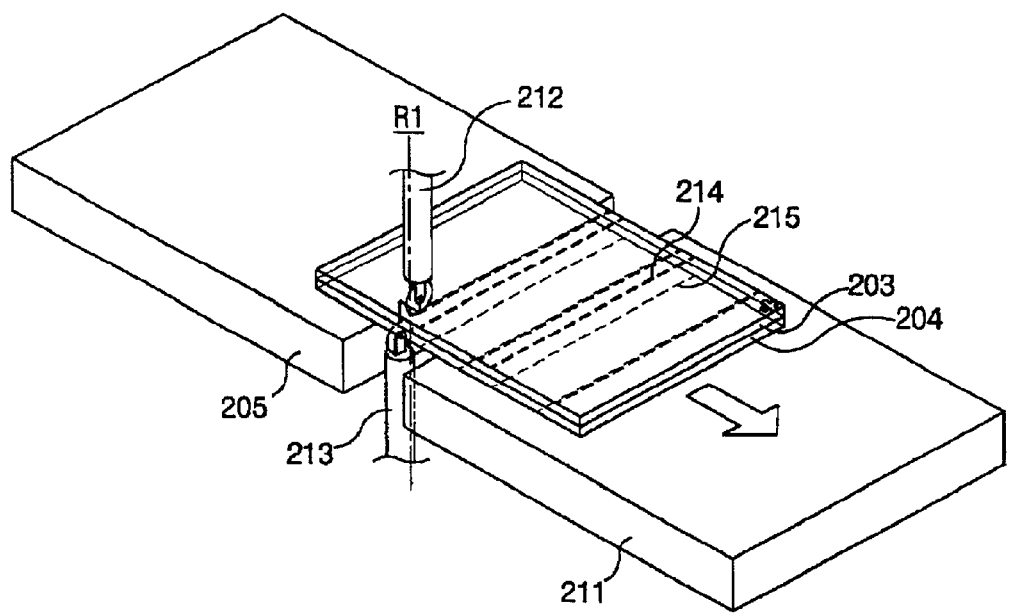

In FIG. 7B, the first scribing unit 210 sequentially forms the first scribing lines 214 and 215 on the surface of the first and second mother substrates 203 and 204 with the first upper wheel 212 and the first lower wheel 213 in the space between the first and second tables 205 and 211. In this process, the first and second mother substrates 203 and 204 move to one direction as far as a predetermined distance so that the first and second mother substrates 203 and 204 may be placed between the first table 205 and the second table 211 that are isolated with the space therebetween.

Figure 7C:
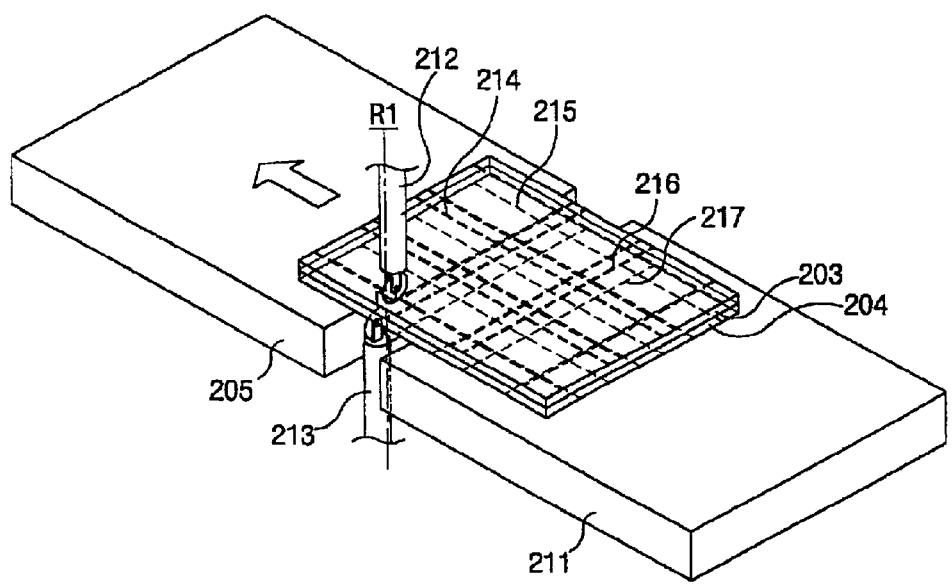

As shown in FIG. 7C, the first scribing unit 210 rotates the first and second mother substrates 203 and 204 having the first scribing lines 214 and 215 by 90°, and sequentially forms a plurality of second scribing lines 216 and 217 on the surface of the first and second mother substrates 203 and 204 with the first upper wheel 212 and the first lower wheel 213 located at the space between the first and second tables 205 and 211. In this process, the first and second mother substrates 203 and 204 move back to the original position, so as to be placed between the first and second tables 205 and 211.

One side of the thin film transistor array substrates formed at the first mother substrate 203 is protruded to be longer than the corresponding side of the color filter substrates formed at the second mother substrate 204.

This is because the data pad unit is formed at one of the left and right sides and the data pad unit is formed at one of the upper and lower sides of the thin film transistor array substrate.

Accordingly, at the region where one side of the thin film transistor array substrates is protruded to be longer than the corresponding side of the color filter substrates, the first upper wheel 212 is isolated for a certain distance to one side of a reference line R1 for forming first and second scribing lines 214 and 216 on the surface of the first mother substrate 203. The first lower wheel 213 is isolated for a certain distance to the opposite direction corresponding to the first upper wheel 212 from the reference line R1 for forming the first and second scribing lines 215 and 217 on the surface of the second mother substrate 204.

Meanwhile, at the region where no gate pad unit or data pad unit of the thin film transistor array substrates is formed (that is, the region where the thin film transistor array substrates are not protruded to be longer than the color filter substrates), the first upper wheel 212 and the first lower wheel 213 are aligned to the straight line. Thus, the first and second scribing lines 214 to 217 are formed on the surface of the first and second mother substrates 203 and 204.

Figure 7D:
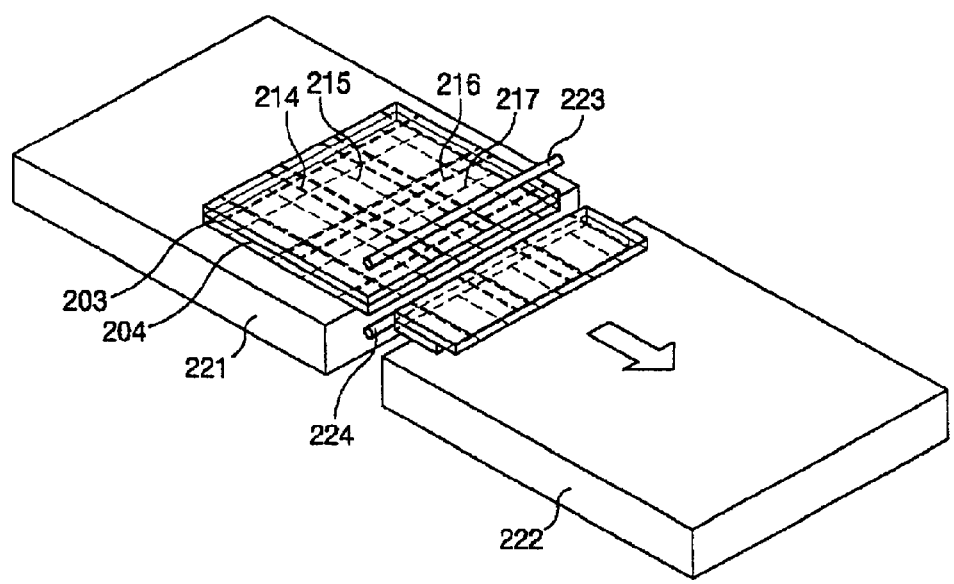

The first breaking unit 220 in FIG. 7D presses the first and second mother substrates 203 and 204 with first and second breaking bars 223 and 224 along the second scribing lines 216 and 217 formed on the surface of the first and second mother substrates 203 and 204 at the space between the third and fourth tables 221 and 222. Thus, a crack is transmitted on the first and second mother substrates 203 and 204. In this process, the first and second mother substrates 203 and 204 move to be placed between the third and fourth tables 221 and 222, thereby cutting the first and second mother substrates 203 and 204.

When the first mother substrate 203 is pressed by the first breaking bar 223, the second breaking bar 224 supports the second mother substrate 204. When the second mother substrate 204 is pressed by the second breaking bar 224, the first breaking bar 223 supports the first mother substrate 203.

Figure 7E:
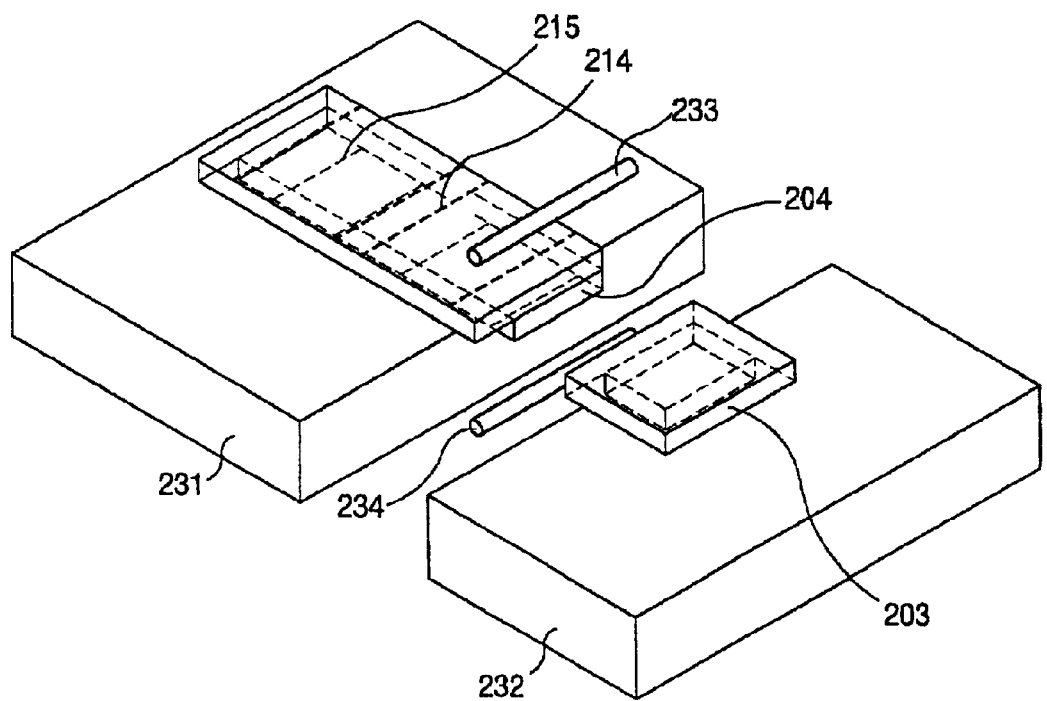

As shown in FIG. 7E, the second breaking unit 230 rotates the cut first and second mother substrates 203 and 204 by 90°, and presses the first and second mother substrates 203 and 204 with third and fourth breaking bars 233 and 234 along the first scribing lines 214 and 215 formed on the surface of the first and second mother substrates 203 and 204 at the space between the fifth and sixth tables 231 and 232. Thus, a crack moves along the scribing lines in the first and second mother substrates 203 and 204 with moving the first and second mother substrates 203 and 204 to be placed between the fifth and sixth tables 231 and 232. The unit panels are then cut out from the first and second mother substrates 203 and 204.

When the third breaking bar 233 presses the first mother substrate 203, the fourth breaking bar 234 supports the second mother substrate 204. When the fourth breaking bar 234 presses the second mother substrate 204, the third breaking bar 233 supports the first mother substrate 203.

Figure 7F:
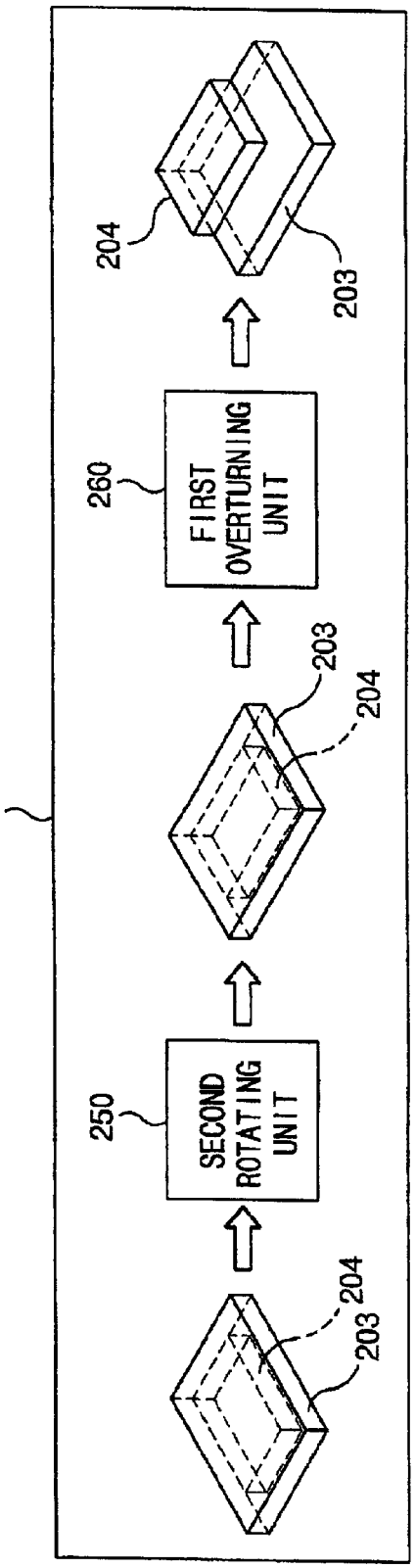

As shown in FIG. 7F, the unloading unit 240 sequentially unloads the unit panels cut along the first and second scribing lines 214 to 217 and conveys to the equipment in the following processes.

Meanwhile, the unit panels conveyed to the unloading unit 240 is rotated by 90° compared to the direction of the loading unit 200, as shown in FIG. 7F. A second rotating unit 250 is installed in the unloading unit 240 so as to rotate the unit panels by 90° and unload the unit panels for more convenient processes.

In addition, in the following process, when a unit panel requires a state that the color filter substrate is stacked on the thin film transistor array substrate, as shown in FIG. 7F, the first overturning unit 260 may be installed in the unloading unit 240 to overturn the unloaded unit panels and convey to the equipment in the following processes.

As aforementioned, referring to the device for cutting a liquid crystal display panel and the method for cutting using the same in accordance with the second embodiment of the present invention, there requires only one time of simultaneous scribing of the first and second mother substrates and two simultaneous breakings of the first and second mother substrates. Also, the liquid crystal display panel is cut into the unit panels by rotating the first and second mother substrates twice.

Figure 8A:
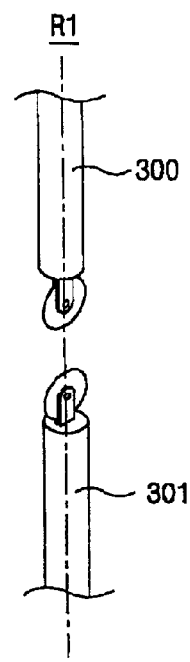
FIGS. 8A to 8C illustrate different alignments of an upper wheel and a lower wheel for simultaneously scribing the first and second mother substrates in accordance with the present invention.
Figure 8B:
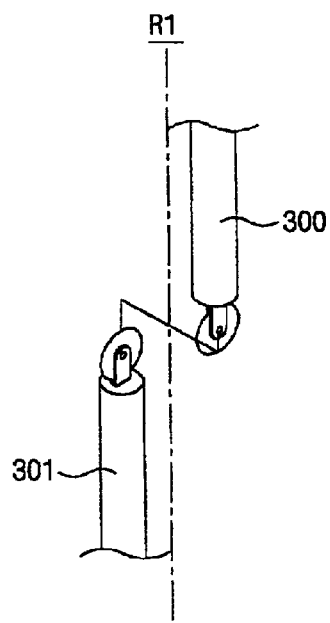
Figure 8C:
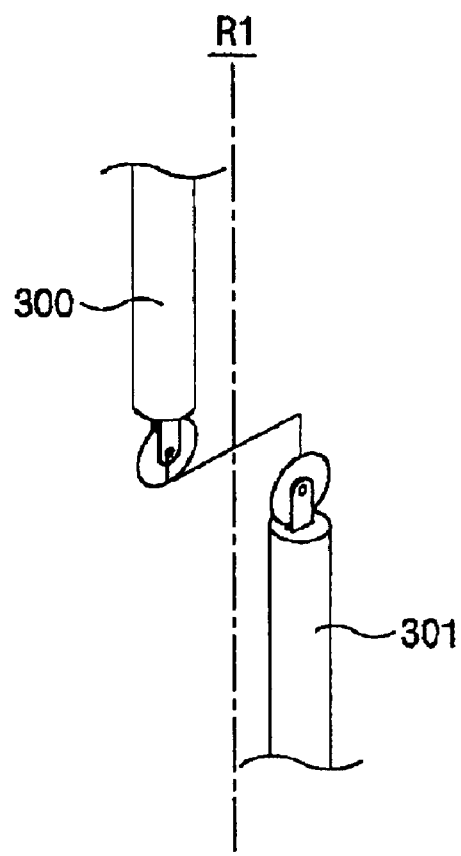

FIGS. 8A to 8C illustrate different alignments of an upper wheel and a lower wheel for simultaneously scribing the first and second mother substrates in accordance with the present invention.

The scribing wheel may have to be replaced due to the abrasion. Thus, the wheel should be easily replaceable in order to improve productivity.

As shown in FIG. 8A, when an upper wheel 300 and a lower wheel 301 are aligned to the reference line R1, they are not easily replaceable and much time is required for a replacement.

Conversely, when the upper wheel 300 and the lower wheel 301 are positioned to be symmetrical in the horizontal direction from the reference line R1, as shown in FIG. 8B, their replacement would be convenient and quick.

FIG. 8C illustrates another embodiment of the upper wheel 300 and the lower wheel 301 to be symmetrical in the forward-backward direction from the reference line R1.

In both of the embodiments of the present invention as described above, the scribing and breaking processes are sequentially performed on the first and the second mother substrates with moving the first and second mother substrates. Alternatively, sequential scribing and breaking processes may be performed on the first and second mother substrates with moving the wheel and the breaking bar.

As described above, the device for cutting a liquid crystal display panel and the method for cutting using the same in accordance with the present invention have many advantages as follows.

That is, referring to the first embodiment, the liquid crystal display panels is cut into the unit panels by two simultaneous scribings of the first and second mother substrates, two simultaneous breakings of the first and second mother substrates, and one time of rotation of the first and second mother substrates.

Therefore, the time required for the scribing is minimized compared to that of the conventional art. Also, since the overturning unit is not necessary to overturn the first and second mother substrates, the time required for the scribing and overturning is reduced and productivity is improved. In addition, the problem of wasting an installation expense and an installation space of the equipment is prevented.

With respect to the second embodiment, the liquid crystal display panel is cut to the unit panels by one time of simultaneous scribing of the first and second mother substrates, two simultaneous breakings of the first and second mother substrates, and two rotations of the first and second mother substrates.

Therefore, the scribing equipment is reduced by one as compared to the first embodiment of the present invention, so that the installation expense and installation space of the equipment may be reduced more.

In addition, since the upper wheel and the lower wheel for the scribing of the present invention are positioned to be symmetrical in the horizontal direction and forward-backward direction from the reference line, they may be easily and conveniently replaced. Thus, the time for replacement may be reduced and the productivity may be improved.

It will be apparent to those skilled in the art that various modifications and variations can be made in the cutter for cutting a liquid crystal panel and the method for cutting using the same of the present invention without departing from the spirit or scope of the inventions. Thus, it is intended that the present invention covers the modifications and variations of this invention provided they come within the scope of the appended claims and their equivalents.

What is claimed is:

1. A device for cutting a liquid crystal display panel, comprising:
   a first scribing unit having first and second wheels for forming a first set of scribing lines on surfaces of first and second mother substrates that are bonded to each other;
   a first breaking unit having first and second breaking bars for breaking the first and second mother substrates along the first set of scribing lines; and
   a first rotating unit for rotating the first and second mother substrates to form a second set of scribing lines.

2. The device of claim 1, further comprising:
   a second scribing unit having third and fourth wheels for forming the second set of scribing lines on surfaces of the first and second mother substrates; and
   a second breaking unit for breaking the first and second mother substrates along the second set of scribing lines.

3. The device of claim 1, wherein the first mother substrate includes a plurality of thin film transistor array substrates and the second mother substrate includes a plurality of color filter substrates.

4. The device of claim 2, wherein the first and third wheels are used to form the first and second sets of scribing lines on the first mother substrate.

5. The device of claim 2, wherein the second and fourth wheels are used to form the first and second sets of scribing lines on the second mother substrate.

6. The device of claim 2, wherein the first and second breaking units have an unloading unit for unloading each separated unit liquid crystal display panel from the first and second mother substrates.

7. The device of claim 6, wherein the unloading unit includes:
   a second rotating unit for rotating the unit liquid crystal display panel by ±90°; and
   a first overturning unit for overturning the unit liquid crystal display panel.

8. The device of claim 1, wherein the first and second wheels are aligned to have a distance enough to change one of the wheels for exchanging at least one wheel.

9. A device for cutting a liquid crystal display panel comprising:
   a first scribing unit having first and second wheels for forming first and second sets of scribing lines on surfaces of first and second mother substrates that are bonded to each other;
   a first breaking unit having first and second breaking bars for breaking the first and second mother substrates along the second set of scribing lines; and
   a second breaking unit having third and fourth breaking bars for breaking the first and second mother substrates along the first set of scribing lines to separate out into a plurality of unit liquid crystal display panels.

10. The device of claim 9, wherein the first mother substrate includes a plurality of thin film transistor array substrates and the second mother substrate includes a plurality of color filter substrates.

11. The device of claim 9, wherein the first scribing unit is capable of rotating the first and second mother substrates by 90°.

12. The device of claim 9, wherein the second breaking unit is capable of rotating the first and second mother substrates by 90°.

13. The device of claim 9, wherein the first and second wheels are aligned to have a distance enough to change one of the wheels for exchanging at least one wheel.

14. A method for cutting a liquid crystal display panel comprising:
   forming a first set of scribing lines using first and second scribing units on surfaces of first and second mother substrates that are bonded to each other;
   performing a first breaking using first and second breaking units along the first set of scribing lines;
   forming a second set of scribing lines using third and fourth scribing units on the surfaces of the first and second mother substrates; and
   performing a second breaking using third and fourth breaking units along the second set of scribing lines.

15. The method of claim 14, wherein the first and second mother substrates are formed in such a manner that the first mother substrate including a plurality of thin film transistor array substrates is stacked on the second mother substrate including a plurality of color filter substrates.

16. The method of claim 14, further comprising rotating the first and second mother substrates by 90° prior to forming the second set of scribing lines.

17. A method for cutting a liquid crystal display panel comprising:
   forming first and second sets of scribing lines using at least two scribing units on surfaces of first and second mother substrates that are bonded to each other;

performing a first breaking using first and second breaking units along the second set of scribing lines; and performing a second breaking using third and fourth breaking units along the first set of scribing lines.

18. The method of claim 17, wherein the first mother substrate includes a plurality of thin film transistor array substrates, and the second mother substrate includes a plurality of color filter substrates.

19. The method of claim 17, further comprising rotating the first and second mother substrates by 90° between the forming of the first and second sets of scribing lines.

20. The method of claim 17, further comprising rotating the first and second mother substrates by 90° prior to performing the second breaking.

* * * * *